Nov. 27, 1951 S. W. BUXTON 2,576,773
LOCKING DEVICE FOR BICYCLES
Filed Sept. 26, 1946 2 SHEETS—SHEET 1
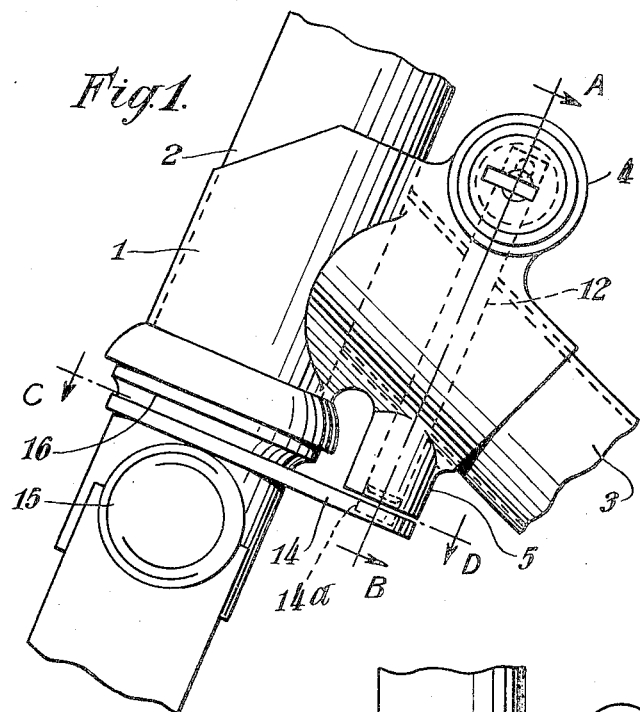
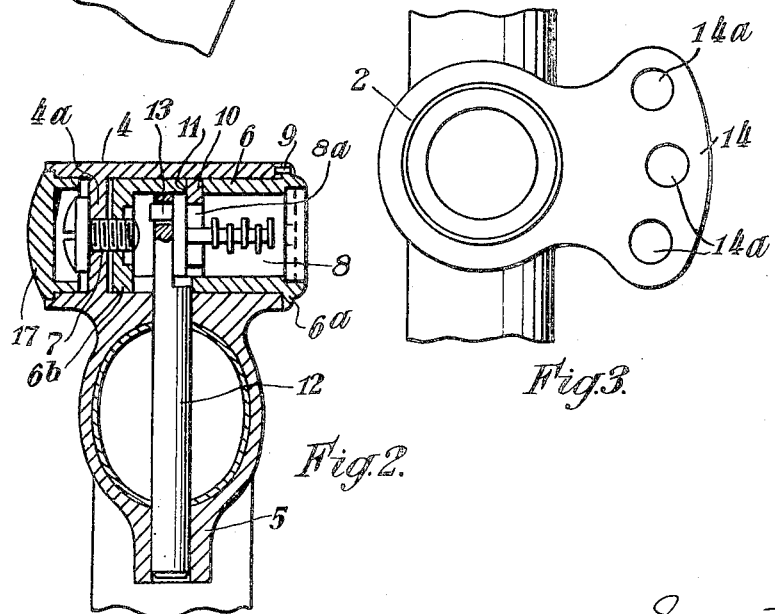

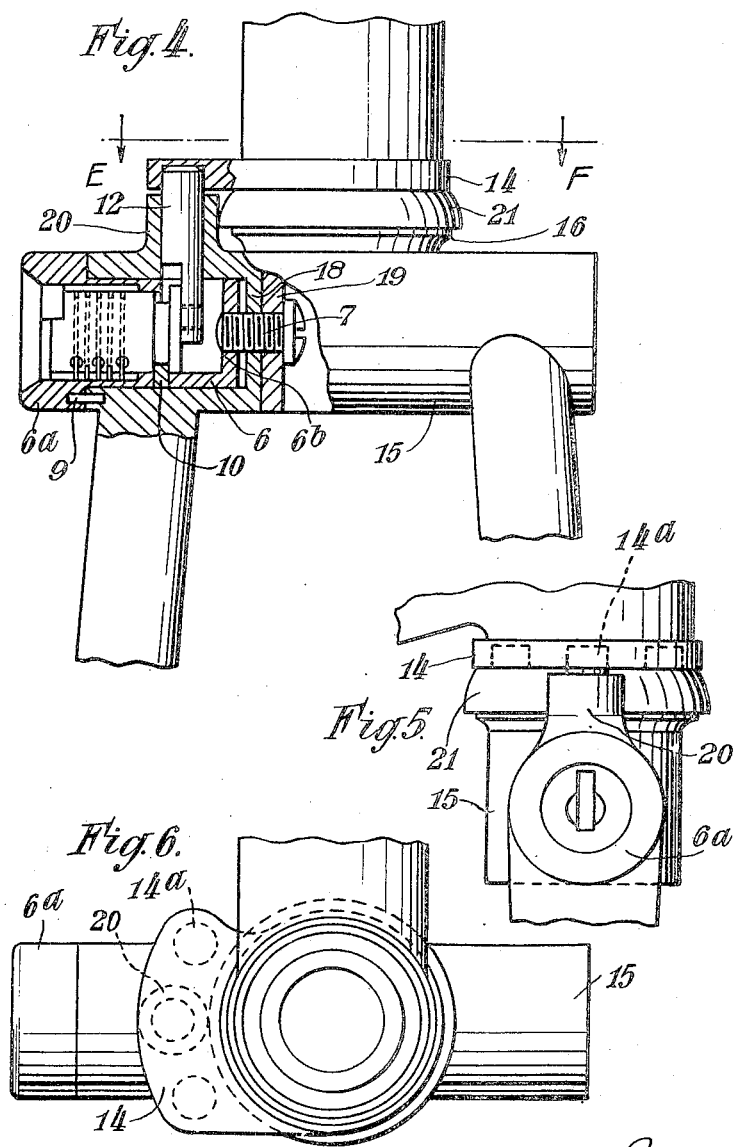

Patented Nov. 27, 1951

2,576,773

UNITED STATES PATENT OFFICE 2,576,773

LOCKING DEVICE FOR BICYCLES

Sidney Walter Buxton, Nottingham, England

Application September 26, 1946, Serial No. 699,578
In Great Britain May 13, 1944

Section 1, Public Law 690, August 8, 1946
Patent expires May 13, 1964

6 Claims. (Cl. 70—185)

This invention relates to locking devices for bicycles, and consists of improved forms of built-in locking device, in contra-distinction to the attachable locks and chains, and similar accessory locking devices in common use.

With a built-in lock on a bicycle, it is essential that the parts should be positively held in the "unlocked" position, for safety's sake, as well as being positively held in the "locked" position, for security's sake. It is also desirable that a built-in lock be inconspicuous, and that it offer alternative positions of the steering wheel and handlebars when locked. All these desiderata are met in a locking device according to this invention.

According to this invention a bicycle lock for locking the front fork to the steering head to prevent relative rotation of those parts comprises a cylinder-type lock secured to one of such parts and of the kind which is rotatably movable from one alternative position to another by means of a key but which is positively secured in either of such positions on removal of the said key, such key being removable only when the cylinder is in either of such positions, a bolt carried by the same part and operably connected to the said cylinder for effecting sliding movement of the bolt upon rotation of the said cylinder by the key so as to cause projection or withdrawal of one end of the bolt from the said part and a bolt-receiver secured to the other of such parts.

The receiver may be a mere obstacle to movement in one direction, for example the edge of a plate, against which the latch may bear, or may be a slot or similar opening to resist movement in opposite directions, and in either case is preferably of a "blind" nature, the latch being shielded by it and safeguarded against tampering. Preferably, the lock is housed in an extension of the bottom head lug, preferably on the inner side, transversely of the machine, and the receiver is attached to the fork crown.

In the accompanying drawing two examples of the invention are illustrated:

Fig. 1 is a side view of a part of a bicycle with the improved lock incorporated in the bottom head lug;

Fig. 2 is a section on the line A—B of Fig. 1; and

Fig. 3 is a section on the line C—D of Fig. 1;

Fig. 4 is a part-sectional front view of a part of a bicycle with the improved lock incorporated in the fork crown;

Fig. 5 is a side view of the same; and

Fig. 6 is a section on the line E—F of Fig. 4.

Referring first to Figs. 1 to 3, the bottom head lug 1, joining the head 2 to the bottom tube 3, has a hollow transverse extension 4 at the inner angle, and has a radial extension or boss 5 below the same. A flanged bush 6 is a close fit in the transverse extension 4 the flange 6a being of the same diameter as the exterior of this extension, whilst the hollow centre of the bush is closed at the inner end by an end wall 6b. It has a radial aperture immediately adjacent such closed end. In this end wall is a tapped hole for screw 7. The hollow centre part of bush 6 is slotted longitudinally at diametrically-opposite points to receive the tumblers of the lock 8 in known manner, in either of two positions, the outer edge of the flange 6a is suitably formed to obtain a neat appearance, and projecting rearwardly from the flange 6a is a pin 9 which enters a hole in the end of the transverse extension 4, to act as a key and prevent rotation of the bush 6.

Fitting within the bush is the barrel-type lock 8, which is of a known form, used commonly in the door handles of automobiles. This lock is a close fit in the bush, and when in position lies flush with the end of the bush (see Fig. 2). Conventional means may be provided to limit the rotation of the lock to a half revolution only. At the rear end of the lock 8 is an annular groove 8a, into which fits the inner edge of a segmental retaining member 10 dropped into a slot 11 in the bush 6, the slot 11 and groove 8a being in register, and the key 10 allowing rotation of the lock but preventing its withdrawal axially.

Arranged diagonally from the transverse extension 4, through the centre of the lug 1 (and the enclosed part of tube 3) and into the lower extension 5 is a sliding pin 12 (the latch). The top end of such pin is halved (see Fig. 2), its flat face lying against the inner end of the lock 8, and the latch pin 12 fits on to a crank-pin 13 projecting from that end of the lock. The lower end of this latch pin 12 is level with or just within the bottom of the said radial extension 5, when withdrawn by the lock 8, but when advanced it enters any one of three sockets 14a in the top side of an apertured plate 14 secured non-rotatably to the top of the fork crown 15, between the crown and the bottom ball race 16. The flanged bush 6 is held in the transverse extension 4 by the said screw 7, which passes through a partition 4a in the extension 4. This screw is then concealed by the insertion of a cap 17 in the end of extension 4.

Referring now to Figs. 4 to 6, the invention is shown applied to a fork with a tubular top cross member of well known construction and currently sold in Great Britain under the trademark "Raleigh" fork. The flanged bush 6 is a close fit in the tubular fork crown 15, the flange 6a is of the same diameter as the exterior of the fork crown, the length of the bush from the flange is a little less than the depth of the socket in the crown, into which it is to fit, and it has a radial aperture 18 near the end wall 6b. The screw 7 passing though partition 19 is provided as in the first example, co-operating with the end wall 6b of the flanged bush 6. 19 is the lower end of the steering column by which the forks are rotatably located in the steering head.

Brazed or welded on to the top of the fork crown 15 is a bush 20 in which is the sliding pin 12 (the latch), the lower end of such pin being halved, and its flat face lying against the end of the lock, on the crank pin 13, as in the first example. The upper end of pin 12 is level with, or just below, the top of the said brazed or welded bush 20, when withdrawn by the lock, but when advanced it enters any one of the three sockets 14a in the under side of the flat plate 14 secured to the lower end of the steering head, between that head and the upper ball cup 21.

What I claim is:

1. A bicycle lock for locking the front fork to the steering head to prevent relative rotation of those parts and wherein the steering head has a bottom lug with rear extension embracing one of the bicycle frame tubes, said bottom head lug being formed with a transverse housing at its upper part over the said rear extension and with a radial boss below such extension and comprising a cylinder-type lock secured in the said transverse housing, the lock being of the kind which is rotatably movable from one alternative position to another by means of a key but which is positively secured in either of such position on removal of the said key, such key being removable only when the cylinder is in either of such positions, a bolt slidably mounted in the said rear extension with one end in the transverse housing and the other end in the said radial boss, a crank pin on the cylinder lock engaging the adjacent end of said bolt and a plate attached non-rotatably to the front fork and having at least one aperture to receive the adjacent end of the bolt when projected from the radial boss by rotation with the key.

2. A bicycle lock for locking the front fork to the steering head to prevent relative rotation of those parts, wherein the said fork is formed with a tubular crown and has an upwardly extending boss near one end and comprising a cylinder-type lock secured in one end of the said tubular crown below the said boss, the lock being of the kind to be rotatably movable from one alternative position to another by means of a key but which is positively secured in either of such positions on removal of the said key, a bolt slidably mounted in the said boss, a crank pin on the cylinder lock engaging the lower end of said bolt and a plate attached non-rotatably to the steering head and having at least one aperture to receive the upper end of the bolt when projected from the said boss by rotation of the key.

3. A device for locking a front fork of a bicycle by preventing relative rotation of the fork in the steering head and comprising a cylindrical lock housing formed in a tubular member of the bicycle, a key-operated lock, a complementary lock plate, one of such members being attached to the front fork and the other to a fixed part of the bicycle frame, the lock including a lock cylinder mounted in said housing and a bolt slidably mounted within said tubular member of the bicycle, the outer end of the bolt projecting from said tubular member and the inner end thereof being connected with the lock cylinder, means connecting the lock cylinder and the bolt, the cylinder being arranged to be turned by said key from one alternative position to another to effect projection or withdrawal of the outer end of the bolt from the tubular member relative to the lock plate, said bolt being disposed substantially parallel to the axis of the steering head.

4. A locking device for bicycles according to claim 3, wherein the steering head is formed with a bottom head lug constituting a tubular portion of the bicycle frame, a housing forming an extension of said lug and which extends transversely of the frame, the key-operated lock being disposed in such housing, the external lock plate being attached to the crown of the fork.

5. A locking device for bicycles according to claim 4, wherein the bottom head lug is formed with a hollow transverse extension to receive the cylinder lock, wherein said lug is also formed with a boss which is prolonged downwardly below said extension in which the sliding bolt extends in a direction substantially parallel to the axis of the steering head from the lock through the boss and so as to be movable into and out of engagement with an external lock plate fixed to the fork.

6. A locking device for bicycles according to claim 3, wherein the cylinder lock has a rotatable member which is carried in a flanged holder enclosed in a cylindrical socket within the bicycle fork crown, a partition being provided inside said socket, a screw for securing said holder to said partition and in which the holder and the rotatable member of the cylinder lock have transverse grooves which coincide with each other, and which are capable of receiving a retaining member for the rotatable member of the cylinder lock, one end of said rotatable member of the cylinder lock having a crank pin directly in engagement with said sliding bolt.

SIDNEY WALTER BUXTON.

REFERENCES CITED

The following references are of record in the file of this patent:

UNITED STATES PATENTS

| Number | Name | Date |
| --- | --- | --- |
| 608,080 | Sangster | July 26, 1898 |
| 1,998,512 | Manton | Apr. 23, 1935 |
| 2,143,502 | Taman | Jan. 10, 1939 |
| 2,358,035 | Schwinn | Sept. 12, 1944 |